United States Patent Office 3,124,593
Patented Mar. 10, 1964

3,124,593
PHARMACOLOGICALLY ACTIVE 2,5-DISUB-
STITUTED PYRROLIDINES
Giorgio Cignarella and Giangiacomo Nathansohn, Milan,
Italy, assignors to Lepetit S.p.A., Milan, Italy
No Drawing. Filed June 12, 1961, Ser. No. 116,296
Claims priority, application Great Britain July 26, 1960
4 Claims. (Cl. 260—313)

The present invention is concerned with new pharmacologically active compounds and a process for the preparation thereof. More particularly, the invention relates to 1-benzyl-2-chloromethyl-5-benzylaminomethyl pyrrolidine and 1-methyl-2-chloromethyl-5-benzylaminomethyl-pyrrolidine and their dihydrochlorides. N-substituted 2,5-dicarbethoxy pyrrolidines have the general formula:

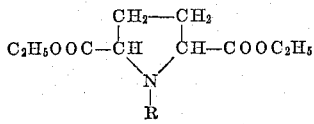

wherein R is benzyl or methyl are the starting compounds for the synthesis of the new pyrrolidine derivatives.

The compounds of the invention are useful as sympatholytic agents.

The toxicity of all compounds is reasonably low, thus allowing the safe administration at the pharmacologically effective doses. For therapeutical purposes the compounds may be associated with a pharmaceutically acceptable carrier, which may be a solid material or a sterile parenteral liquid in dosage unit form containing from 0.010 to 0.100 gram of the active compound.

The process for their preparation depends on the various groupings at positions 2, 5 of the final compounds. Thus chloromethyl derivatives are prepared by reducing a compound having the general formula with LiAlH$_4$ and treating the hydroxymethyl derivatives so obtained with thionyl chloride; N-substituted aminomethyl derivatives are obtained by reacting a compound having the general formula with an amine and reducing the resulting carbamyl derivatives with LiAlH$_4$.

The compounds of the invention are active as adrenolytic, hypotensive and vasodilator agents. The following non-limitative examples are illustrative of the invention.

EXAMPLE I

N-Methyl-2-Benzylaminomethyl-5-Chloromethyl-
Pyrrolidine-Dihydrochloride

A mixture of 10 g. of N-methyl-2,5-dicarbethoxy-pyrrolidine, 5.1 g. of dibenzylamine and 30 ml. of xylol is refluxed for 24 hours. The solvent is removed and the residue rectified. 8.8 g. of N-methyl-2-benzylcarbamyl-5-carbethoxy-pyrrolidine are obtained; B.P. 155–157° C./0.15 mm. A solution of 10 g. of the obtained product in 50 ml. of anhydrous ethyl ether is added with stirring over 20 minutes to a suspension of 13.93 g. of LiAlH$_4$ in 100 ml. of anhydrous diethyl ether at 0° C.

The solution is mildly refluxed for 3 hours, cooled to −5° C., cautiously decomposed with water and filtered. The ether solution is dried over Na$_2$SO$_4$, evaporated and distilled. 6.5 g. of N-methyl-2-benzylaminomethyl-5-oxy-methyl-pyrrolidine are obtained; B.P. 131–132° C./0.3 mm. To 5 g. of this product dissolved in 50 ml. of benzene, 2.35 ml. of thionyl chloride in 10 ml. of benzene are added dropwise with stirring. The solution is mildly refluxed for 15 minutes and cooled; 10 ml. of saturated ether of hydrochloric acid are added to complete the separation of the product as hydrochloride and the solution is evaporated in vacuo. Then the residue is taken up with anhydrous benzene, filtered and crystallised from absolute ethanol. Yield 4.7 g.; M.P. 187–189°.

EXAMPLE II

N-Benzyl-2-Benzylaminomethyl-5-Chloromethyl-
Pyrrolidine Dihydrochloride

The above compound is prepared as described in Example I for the N-methyl derivative starting from N-benzyl-2,5-dicarbethoxy-pyrrolidine, prepared from diethyl α,α′-dibromoadipate and benzylamine in benzene solution. Yield 71%; M.P. 183–184° C.

We claim:
1. 1-benzyl-2-chloromethyl-5 - benzylaminomethyl-pyrrolidine dihydrochloride.
2. 1-methyl-2-chloromethyl-5 - benzylaminomethyl-pyrrolidine dihydrochloride.
3. 1-benzyl-2-chloromethyl-5 - benzylaminomethyl-pyrrolidine.
4. 1-methyl-2-chloromethyl-5 - benzylaminomethyl-pyrrolidine.

References Cited in the file of this patent
UNITED STATES PATENTS

| | | |
|---|---|---|
| 2,777,858 | Girod et al. | Jan. 15, 1957 |
| 2,779,766 | Middleton | Jan. 29, 1957 |
| 2,804,422 | Schumann et al. | Aug. 27, 1957 |
| 2,902,404 | Spencer | Sept. 1, 1959 |
| 3,006,920 | Boehme et al. | Oct. 31, 1961 |

OTHER REFERENCES

Cignarella et al.: Gazz. Chim. Ital., vol. 90, pp. 1495–1503 (1960).
Schipper et al.: J. Org. Chem., vol. 26, pp. 3599–3602 (September 1961).